March 3, 1931.  A. SCHWARZ  1,794,799
ART OF INTERNAL COMBUSTION ENGINES
Filed Sept. 7, 1929
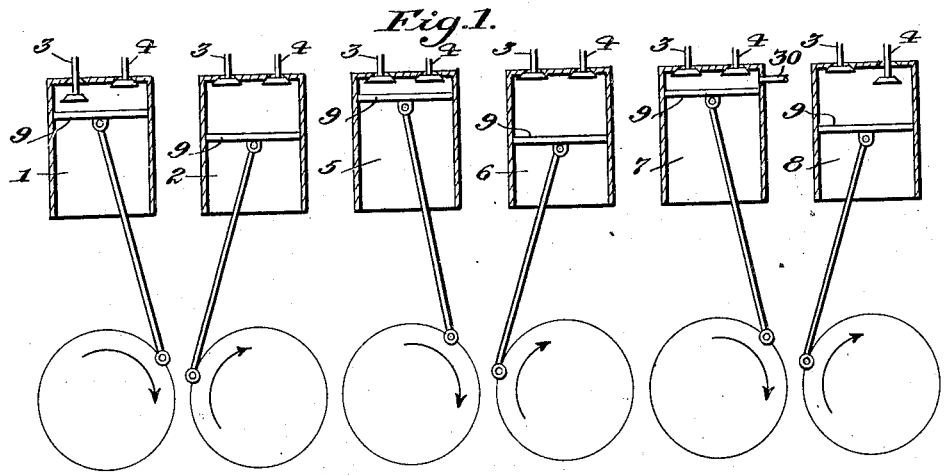
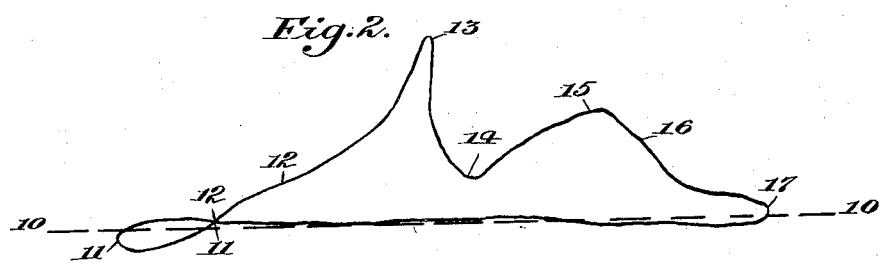
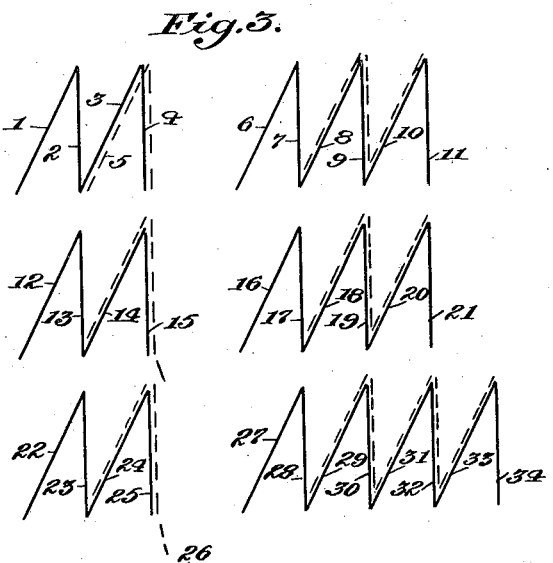
Inventor:
Alfred Schwarz,
Att'y.

Patented Mar. 3, 1931

1,794,799

UNITED STATES PATENT OFFICE

ALFRED SCHWARZ, OF MONTCLAIR, NEW JERSEY, ASSIGNOR, BY MESNE ASSIGNMENTS, TO HOLLOYT MOTORS CORPORATION, OF NEW YORK, N. Y., A CORPORATION OF DELAWARE

ART OF INTERNAL-COMBUSTION ENGINES

Application filed September 7, 1929. Serial No. 391,041.

My invention relates to internal combustion engines and more particularly has reference to a mode of increasing the thermal efficiency thereof.

Heretofore internal combustion engines, particularly those which used as a fuel, oil, gasoline and the like, had a thermal efficiency of about twenty to twenty-five per cent. The heat losses were due to several causes. A large percentage of the heat was carried off by the exhaust in the form of sensible heat. Another portion was carried off by the exhaust in the form of unburned fuel and still another part was carried off through the water jacket.

It is the object of the present invention to increase the thermal efficiency of such engines.

It has been found by experimentation that the time given to the gases for combustion and expansion is too short; and that the compression curve is inverse to the requirements of the gases. For example, the leaner the gas, the higher should be the compression in order to obtain complete combustion, but in the present engine explosion takes place when the mixture is rich and under a maximum compression, and the leaner portions, which should continue to burn while the piston is receding, are deprived of proper compression and therefore do not burn and are wasted. It is a part of the present invention to recompress such lean gases while they are still at high temperature thereby creating the proper condition for their combustion and in that manner also providing additional time for the more complete expansion of the products of combustion of what might be termed the primary explosion.

It must be remembered that in accordance with the existing theories, no fuel is subject to combustion unless it is first gasified, or in other words, the air being a gas, it is necessary to create a condition of similar molecular structure in the fuel, in order to facilitate the union between the atoms of carbon, hydrogen and oxygen.

It is therefore readily understood that the process of generating power within the cylinder is composed of two principal actions, one of them being the gasification of the fuel, and the other being its combustion. By gasification I do not mean vaporization, which might be taken care of in the conventional carburetor. While it is entirely possible that some of the globules may expose some atoms of carbon and hydrogen to contact with oxygen, but of course this is an incomplete action, and in order to obtain complete combustion, molecular and atomic conditions must be established by gasification.

Gasification is a matter of time and temperature. A certain amount of oil may be gasified at a certain temperature and within a certain time, and perhaps also at a certain pressure.

Assuming that the cylinder after the intake stroke and before the compression stroke has a temperature of 600° F., this temperature would be insufficient to gasify the oil. Compressing the mixture to say 70 lbs. the temperature would rise to about 800° F. and the oil more easily cracked or decomposed. Portions of the oil may be gasified. At this point the explosion may take place and the gasified portion together with some vaporized oil may burn, the total of which may amount to about 50% of the fuel charge. By this time the piston has reached the point where the exhaust valve opens. The temperature and time allotted to the oil has gasified but not burned the other 50% of the fuel. Combustion now takes place in the exhaust manifold. It may readily be seen that this portion of the fuel is wasted.

The above temperatures and time factors are more or less assumptive, but as may be learned from the analysis of the exhaust gases the process going on in the present day gasoline and oil engine is well pictured in the above example because a very large percentage of unburned fuel in the form of C.O.—C.H.$_4$ or the like is found in the exhaust. It is also a fact that some of these gases burn in the exhaust manifold because flames are visible on removal of the exhaust manifold.

It is another object of the present invention to cause gasification and particularly combustion within the cylinder only, thus causing the entire fuel values to perform useful work.

It must also be remembered that the fuel is taken in, gasified and burned, all in a fraction of a second, and unless conditions are perfect, complete results cannot be obtained, on account of the fact above mentioned, that as the gases become leaner, compression is reduced in the ordinary internal combustion engine, which condition is contrary to the correct one.

Examining the exhaust gas of any internal combustion engine, we find that there is approximately as much unburned fuel left in these gases as there was converted into power. By this I mean, when we account for the total B. t. u. values in the fuel which was fed to the engine, and account for the horsepower on a theoretical basis, we find that approximately an equivalent amount was wasted in unburned fuel. There is a very large waste of heat.

The fuel, however, contained in the exhaust gas, is not in its original state. When it entered the engine it was a liquid hydro-carbon, and when it leaves with the exhaust, it is a gas. This change was due to the fact that the unburned oil was treated under pressure up to about 300 pounds per square inch and at a temperature of up to about 2,000° F. After thus being gasified in the cylinder the fuel is in an ideal condition to be exploded, but at that time the operating cycle of the engine is completed, and this gas then goes to waste.

It is still another object of the present invention to provide the appropriate compression to explode these lean residual gases and to impart the power derived from the resultant explosion to the crankshaft of the engine.

It is well known to those versed in the art, that the leaner the gas, the higher the compression necessary to fire said gas and it is also well understood that heated gases occupy a larger volume than cold gases. It follows, therefore, that if the gases after being once exploded (but still containing combustibles) and air or oxygen is available and if they are recompressed in either the same or an additional cylinder, more power can be extracted from them. Not only will the additional fuel burned deliver more power, but also the hot products of combustion from the primary explosion will have more time to expand further and the overall economy of the engine will be materially improved.

Summarizing the requirements for an ideal internal combustion engine, we would have as follows:

The engine should burn the fuel completely;

The gases should be expanded practically to atmospheric pressure and temperature;

The engine should remain sufficiently cool to avoid injury to the working parts;

And the radiation, either direct from the engine or indirectly through a cooling medium, should be eliminated.

Speaking in a general way, the internal combustion engine such as is being used today has the following defects:

It does not burn its fuel completely;

It exhausts unexpanded gases at very high temperature;

It has a great deal of direct radiation and has specific means, namely, the cooling system, to dissipate large quantities of heat.

I have previously outlined how much better economy can be accomplished by recompressing the exhaust gases and refiring the same, and it is also a part of the present invention to eliminate cooling the engine with air or water externally. Instead of this, I cool the engine internally by injecting into the cylinder a cooling fluid such as water toward the end of the cycle. Such cooling fluid will expand and add to the motive force driving the engine.

It is not feasible to inject such cooling fluids during the primary explosion because, as has been shown above, the combustion is incomplete and injection of a cooling fluid would create a still worse condition, whereas if conditions are created by which complete combustion is obtained, then the injection of a cooling fluid is permissible and very advantageous.

In carrying out the invention, I preferably proceed as follows:

One method of carrying out the invention consists in changing the cycle of an engine in such a manner that an additional compression stroke and an additional power stroke are added to what is known as a four-cycle engine. The cycle then consists of the following motions: the first downward stroke of the piston is the intake stroke; the next upward stroke is a compression stroke; the next downward stroke is a firing stroke; the next upward stroke is another compression stroke. Near the top of this second compression stroke air may be injected if so desired, and on the next downward stroke the remainder of the combustibles is fired. About half way down on this second firing stroke, the cooling fluid is injected, thus generating steam if water is employed, and cooling the engine. The next upward stroke is the exhaust stroke, and then follows the intake stroke again and the cycle repeated.

I desire to point out that the process of combustion going on in the cylinders during the second compression stroke and the second firing stroke is not fully known to me. However, investigation up to the present time seems to indicate that there is reason to believe that the combustion is continued after the first explosion stroke throughout the second compression stroke but reaches another peak at the top of the second compression stroke, dying out gradually during the second firing stroke. It is also within the scope of my invention to operate the engine without the addition of a cooling fluid.

While I have described the addition to two motions to the four cycle engine, I contemplate the use of additional strokes; as many in number as I may deem advantageous to the more complete utilization of the fuel and the heat available.

It is of course understood that the time of the valves and ignition may be different on differently designed engines. For example, a Diesel type engine may be operated on the following cycle: Air is first taken in and compressed to any suitable pressure, and near the end of the compression stroke fuel is injected which automatically fires the charge, after which the second compression stroke follows, no further ignition being necessary, because the gases were hot enough to ignite when the second compression stroke occurred. Thereafter the second power stroke takes place and then of course the exhaust stroke follows.

The invention may be operated with or without injection of a cooling fluid and any type of fuel may be used and any type of ignition may be employed.

The cycle may be termed a six-cycle, but it is within the scope of my invention to repeat compression and firing as often as I may deem it desirable. As a matter of fact, I have operated an engine in which the fuel was fired a number of times, and in which the curve of the cycle consisted of a continuous wave as compared with the ordinary curve which reaches only a single peak.

It may be readily seen that such a cycle conforms more nearly with the ideal engine described above because as the fuel becomes leaner, increased compression facilitates its combustion. The increase in pressure over the first compression is due to the fact that the gases were first compressed cold and then hot.

I may elect to transfer the gases after the completion of the conventional four-cycle operation into another cylinder, recompressing same therein to any suitable pressure and refiring the gases by any suitable means of ignition. I may also add fuel or air or oxygen, or any of them during the repetition of the cycle.

For a more detailed description of my invention, reference will be had to the accompanying drawing in which Figure 1 is a conventional illustration of the six strokes of a six-cycle engine operated in accordance with my invention;

Figure 2 represents a pressure curve illustrating the pressure conditions within the cylinders; and Figure 3 represents a series of curves illustrating by comparison the combustion in a four-cycle engine and in a six-cycle engine.

Referring to Figure 1, at reference numeral 1 there is illustrated the suction stroke with the piston 9 traveling downward, intake valve 3 being open and exhaust valve 4 being closed. Numeral 2 represents the first compression stroke, both the intake valve 3 and the exhaust valve 4 being closed. Reference character 5 represents the first power stroke, intake 3 and exhaust 4 being closed. Numeral 6 represents the second compression stroke, intake 3 and exhaust 4 being closed. Numeral 7 represents the second power stroke, intake 3 and exhaust 4 being closed. Numeral 8 represents the exhaust stroke, intake valve 3 being closed and 4 being open. This diagram illustrates the operation of the process in a single cylinder. It is of course understood that if the process is to be carried on in two cylinders, two four-cycle cylinders are required. The gases are exhausted from one and taken in by the other. At 30 I have conventionally shown an inlet for introducing cooling fluid, such as water, during the second firing or power stroke indicated by numeral 7, as heretofore described.

Figure 2 represents a pressure curve which has been arbitrarily constructed merely to help visualize the pressure conditions existing in the cylinders. Corresponding to Figure 1, during the intake period there is a slight vacuum. Line 10—10 represents atmospheric pressure. Section 11—11 represents the intake period. Section 12—12 represents the compression period. Section 12—13 represents the explosion period. Section 13—14 represents the power stroke. Section 14—15 represents the second compression period. Section 15—16 represents a more rapid burning during maximum compression and section 16—17 represents expansion during the last part of the power stroke and during the exhaust period.

The question might be asked whether the fire continues throughout the first power stroke and the second compression stroke and the second power stroke, and if so, why the reaction during the compression stroke does not act as a retardment. This may be answered as follows:—

In the first place, one of the reasons why not all of the fuel was burned during the first power stroke is, as the mixture becomes leaner, increased compression should force the remaining molecular structures closer together for reaction. However, the piston recedes and the pressure becomes less, and due to this condition, combustion decreases until near the top of the second compression stroke; close contact of the remaining fuel and air is again established and combustion increases again at the top of the stroke which is a perfectly normal and proper place for combustion. If, however, a certain amount of combustion does take place during the earlier part of the second compression stroke, the energy of the first explosion together with the momentum of the flywheel overpowers temporarily such reaction and stores the energy so created until the top of the stroke is reached, when the balance is thrown the other way and the power so stored up will then be released and act upon the crankshaft in the proper direction. Just the same as the compression stroke in any engine is not a detriment but the power temporarily used for compression is again released and joins the power created by the combustion of fuel in the right direction.

As another example of rectification of energy lines, it may be cited that if two currents of direct electricity meet in opposite directions, the stronger current will overpower the weaker current and the two will flow in the direction of the stronger current. As a matter of fact, an engine built on the principle of my invention shows equal power to an engine of the same dimensions on less than one-half of the fuel consumptions which indicates conclusively that there is no retarding action created during the second compression stroke.

As I have already mentioned in the beginning of this specification, the efficiency of an internal combustion engine at present is somewhere about 20% and the losses are due to many contributing factors, and in designing an engine of greater efficiency a number, if not all, of these defects of previous designs must be eliminated in order to derive better economies.

As is well known, increased compression leads to better economy, but compression is limited by pre-ignition. Pre-ignition in turn is the result of excess oxygen and heat. If an engine is operated wastefully by burning so much fuel that the exhaust leaves the engine at say 1400° F., the cylinder after the exhaust stroke is left at higher temperature than if the exhaust gas had discharged at say 700° F. In consequence, a leaner mixture can be employed and a higher compression can be used which in turn results in greater economy.

In my cycle I exhaust below 650° F. as against the normal exhaust temperature of 1200° or 1400° F., and I am therefore able to use a leaner mixture at higher compression. The reason that I can exhaust at lower temperature lies in the fact that in my cycle three times the time is allotted to combustion and expansion, and therefore the gases are much cooler when the time arrives for discharging same out of the cylinder.

In the economical operation of an engine, it is of course important that the quantity of fuel consumed should be at a minimum, but since the quality of fuel determines its price, it is also important that an engine should be capable of consuming a fuel of lower quality and price. It is a well known fact that high speed engines of the type now used in automobiles and aeroplanes, etc., are not capable of consuming a fuel of a specification higher in boiling points than gasoline. As a matter of fact, even gasoline is not completely consumed. If kerosene or fuel oils are used, the power production diminishes as the oil becomes heavier, the waste in unburned fuel and sensible heat increases and what might be gained in price is completely offset by the losses.

Figure 3 illustrates, by way of curves the combustion of gases which is the most perfect. These curves illustrate comparatively the combustion in a four-cycle engine and in six-cycle engine. Numeral 1 in Figure 3 represents the intake stroke; number 2 the compression stroke; number 3 the power stroke and number 4 the exhaust stroke. The dotted line 5 represents the burning period approximately on a four-cycle engine and it may be seen that the burning period lasts through the power stroke and the exhaust stroke, and that part extending through the exhaust stroke of course is useless.

The next curve shows the six-cycle operation in accordance with my invention on fixed gas the same as the previous curve did. Number 6 is the intake stroke; number 7 the first compression; number 8 the first power stroke; number 9 the second compression; number 10 the second power stroke; number 11 the exhaust. The dotted line shows combustion and expansion on 8, 9, and 10. Before exhaust 11 opens, it is evident that whatever pressure is created is utilized during 9 and 10. In the next curve, number 12 represents the intake stroke on a four-cycle engine; number 13 compression stroke; number 14 power stroke and number 15 exhaust. It is assumed that this engine is operated on gasoline. The dotted line indicates the combustion period and it may be seen that combustion lasts not only through the power stroke, but also through the exhaust stroke, and beyond the exhaust stroke all of course is useless excepting the portion within the power stroke. In the next curve, number 16 represents the intake stroke of a six-cycle engine; number 17 represents compression stroke; number 18 power stroke; number 19 second compression stroke; number 20 second power stroke; number 21 exhaust. The dotted line represents the combustion period and it may be seen that the excess shown on 15 in the exhaust stroke and outside of the engine is now placed within 19 and 20. Number 22 represents the intake stroke of a four-cycle engine; number 23 compression stroke; number 24 the power stroke; number 25 the exhaust stroke. It is assumed that this engine operates on fuel oil and the dotted line shows a small amount of combustion during the power stroke, further combustion during the exhaust stroke 25 and a great deal of combustion outside of the engine which is indicated at 26. In order to take care of this excess the curve of an eightcycle engine is illustrated. Number 27 is the intake stroke; number 28 the compression stroke; number 29 power stroke; number 30 second compression stroke; number 31 second power stroke; number 32 third compression stroke; number 34 exhaust. The dotted line representing the combustion period starts at the first power stroke 29 and continues through 30, 31, 32 and 33, so that all of the combustion taken place previously in 25 and 26 representing absolute waste now takes place inside of the engine and delivers useful work.

A comparison between the analysis of the exhaust gas of a four-cycle engine before same was converted into a six-cycle engine and analysis after conversion, gave evidence of the advantageous results herein referred to. When operated as a four-cycle engine 54.1 B. t. u. were contained in a given volume of the exhaust gas. This engine delivered about three horsepower and exhausted about 1200 cubic feet per hour. Before conversion, therefore, this engine delivered three horsepower which is equal to 7630 B. t. u. It exhausted as unburned fuel 6480 B. t. u. or practically as much fuel was exhausted in the form of carbon monoxide, hydrogen and methane as went to useful work. In addition the exhaust temperature was 1400° F., indicating a considerable loss in sensible heat. After conversion the engine produced three horsepower, exhausted 1200 cubic feet of waste gas with a value of .7 B. t. u. for the same volume of gas which measured 54.1 B. t. u. before conversion, the temperature of the gas having been 640° F., all of which shows just double the thermal efficiency as against the operation before conversion.

Having described my invention, what I claim as new and desire to secure by Letters Patent is:

1. The process of operating an internal combustion engine comprising, introducing a charge of combustibles and oxygen into a cylinder, compressing same, firing same, recompressing said charge under continued ignition, and then exhausting the products of combustion.

2. The process of operating an internal combustion engine comprising, introducing a charge of combustibles and oxygen into a cylinder, compressing same, firing same, repeatedly recompressing said charge until the major portion of heat values are converted into mechanical energy, then exhausting said charge and admitting a new charge of combustibles and oxygen for a repetition of the cycle.

3. The process of operating an internal combustion engine comprising, introducing a charge of combustibles and air into a cylinder, firing same, recompressing same until substantially complete combustion is attained, injecting a cooling fluid into the cylinder thereby increasing the volume but decreasing the temperature of the resultant gases, expanding said gases and cooling fluid for the purpose of generating power, exhausting the contents of the cylinder, and repeating the cycle.

4. The process of operating an internal combustion engine comprising, introducing a charge of combustibles and air into a cylinder, firing same, recompressing same until substantially complete combustion is attained, injecting water into the cylinder thereby increasing the volume but decreasing the temperature of the resultant gases, expanding said gases and cooling fluid for the purpose of generating power; exhausting the contents of the cylinder, and repeating the cycle.

5. The process of converting heat of combustion into mechanical energy comprising, forming a combustible mixture, repeatingly compressing and igniting said mixture until substantially complete combustion and expansion is obtained.

6. In an internal combustion engine, means for taking in a combustible mixture, means for compressing said mixture, means for firing said mixture, means for again compressing the gases resulting from the previous treatment, means for again firing such compressed charge and means for exhausting the products of combustion.

7. In an internal combustion engine, means for taking in a combustible charge, means for repeatedly compressing and firing said charge until substantially all of the heat of combustion is converted into mechanical energy, and means for exhausting said products of combustion.

In testimony whereof I affix my signature.

ALFRED SCHWARZ.